Patented July 1, 1947

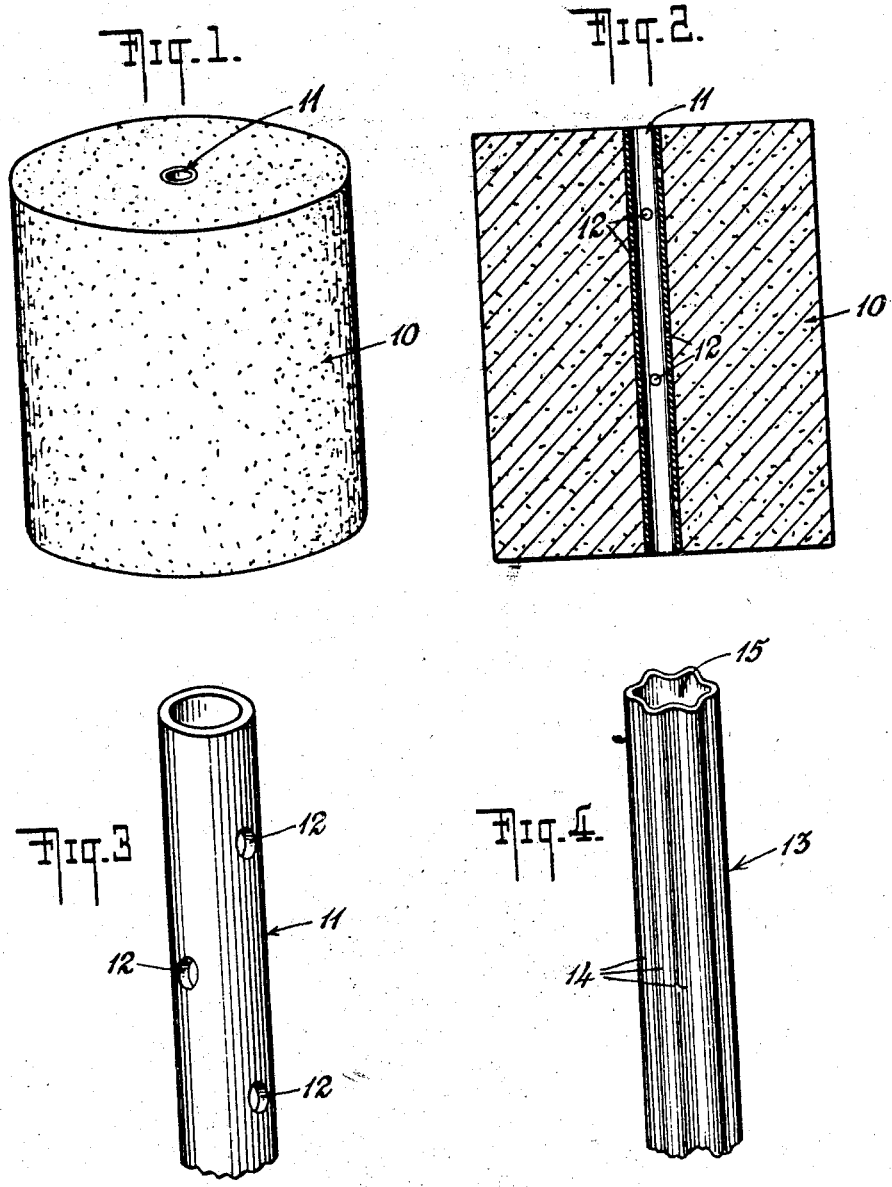

2,423,300

UNITED STATES PATENT OFFICE 2,423,300

MANUFACTURE OF CHEESE

William Faehndrich, New York, N. Y.

Application April 21, 1944, Serial No. 532,085

2 Claims. (Cl. 99—115)

This invention relates to the manufacture of cheese and more particularly to those high cultured cheeses made with Roquefort bacilli and having no binding material present, such as, Roquefort, Bleu and Gorganzola, although the invention may be used to equal advantage with other types of cheese than the three named.

Cheeses of the indicated type are usually made by packing the prepared curd in cylindrically shaped molds about eight inches in diameter and about ten inches high and maintaining the cheese in such molds until it is sufficiently dried and compacted and then curing the cheese in a chamber, such as, a deep cavern, in which the temperature is always about 40° F. and until the cheese has assumed the proper color for use. This process usually takes about three months when following the present known practices. It is common knowledge that such cheeses are not of uniform texture throughout, for while the exterior outer portions thereof have a firm, smooth consistency or texture, the core or central portions of these cheeses are invariably of a crumbly nature. Thus, when the cheese is sold in wedge shaped pieces, as is usual, the central portion of the cheese or apex of the cut invariably crumbles away, leaving an uneven cut which when served must be further trimmed or cut by the user to satisfy the esthetic senses. Even without this waste in preparing the cheese for the table, it is estimated that the retailer, due to the crumbling away of the cheese in cutting, loses from six to eight ounces out of every five pound cake of cheese. It is believed that this condition of these cheeses is principally due to the excess moisture which remains in the core of the cheese long after the required curing period for the cheese, as a whole, has terminated and because of this, the core of the cheese never arrives at the same texture as that of the outer portions thereof, but remains in a moist, crumbly condition.

It is the principal purpose of this invention to provide an improved method of manufacturing cheeses of the indicated type, whereby the texture of such cheeses will be substantially uniform throughout and there will be eliminated the crumbly condition found in such cheeses when made in accordance with present known practices.

Another object of the invention is to provide an improved method of manufacturing cheeses of the indicated type which will substantially reduce the period now employed in making such cheeses and will eliminate the waste inherent in present practices.

A further object of the invention is to provide a cheese of the indicated type which will be of substantially uniform texture throughout and will make possible the provision of even cuts from a cake of cheese.

Other objects as well as the novel features of the invention will become apparent after a perusal of the following description when read in connection with the accompanying drawings in which Fig. 1 is a perspective view of cheese made in accordance with the invention; Fig. 2 is a central vertical sectional view of the cheese shown in Fig. 1; Fig. 3 is a perspective view of the core member provided in the cheese illustrated in Figs. 1 and 2 and Fig. 4 is a similar view of another form of core member which may be utilized in carrying out the invention.

In the drawings, the reference numeral 10 designates the cheese while the reference numeral 11 designates the core member which extends through the axial center of the cheese. As is shown more clearly in Figs. 2 and 3 of the drawings, the core member 11 is cylindrically shaped, having an external diameter of about ¾ inch, and is provided with a plurality of perforations 12. The core member 11 may be made of any suitable material which will not affect or be injurious to the cheese, such as, white pine, thermoplastic material, etc.

In accordance with the invention, the prepared curd from which the cheese is to be made, is packed into cylindrically-shaped molds in the usual manner, the curd being packed around a core member 11 which has previously been properly positioned in the mold, or the core member being inserted through the axial center of the curd either immediately after the latter has been packed into the mold or after the curd has been sufficiently dried and compacted and is ready for the curing treatment. Prior to the curing treatment, the central passage of the member 11 is cleaned out by removing any curd which may have accumulated therein either as a result of the packing of the curd about such member or by reason of such member being inserted through the curd. The cheese is then placed for curing in a chamber having the desired uniform temperature, such as, a deep cavern. While in the chamber the cheese is positioned so that the core member is substantially horizontal. As a result of the core member 11, any excess whey or moisture in the center of the cheese will drain out through the apertures 12 in the walls of such member, into the central passage of such member and thence out of the open ends of such passage. The cheese is frequently moved during the curing period so that all interior portions of the cheese are properly drained by the member 11. The apertures 12 should be so arranged on the core member 11 as to accomplish a substantially uniform drainage throughout the thickness of the cheese. It has been found that six or eight apertures properly distributed on the core member will be sufficient but more can be provided if considered desirable. By reason of this draining action the cheese will cure uniformly throughout to provide a cheese of uniform texture in which there is no portion of a moist, crumbly nature. As a result of this action also, the cheese culture will cure faster than in present known methods. Experiment has demonstrated that cheeses that now take three months to process following present known methods will process in half that time, about one and one-half months when following the method of the instant invention. The core member 11 is maintained in the cheese until it is ready for cutting by the retailer. It will be found at that time to be relatively easy to remove the core member without breakage of the cheese, thereby providing a central opening of approximately three-quarter inch diameter which will facilitate the cutting operations. As a result of such opening and the uniform texture of the cheese, even portions may be cut from the cheese without any waste whatsoever and in a condition to be used, as cut, on the table.

While there is shown in Figs. 1 to 3 of the drawings, a preferred form of core member, it will be evident to those skilled in the art, that core members of other forms and construction may be utilized to accomplish the purposes of the invention. For instance, instead of utilizing a cylindrically-shaped, perforated member, such as, the member 11, there may be used to equal advantage, the type of core member designated 13 in Fig. 4 of the drawings. In this core member 13, there are provided in place of the apertures of member 11, a number of longitudinally extending corrugations 14 which provide a plurality of drainage channels for the excess whey or moisture in the interior of the cheese and facilitate its discharge at the sides of the cheese. The core member 13 may be made solid or have a central aperture 15 of cylindrical or corrugated shape as shown, to enable the member to be more readily inserted into the cheese.

I claim:

1. In the manufacture of cheese, forming the prepared curd into an annular shape by embedding at the central axial portion of a mass of curd, a separate, unitary core member capable of draining moisture from the interior of the cheese to the exterior thereof, curing the cheese with such unitary core member retained therein and disposed in a substantially horizontal position, in a chamber having the desired uniform temperature and for a substantially long period until the cheese has assumed the proper color for use, and during such curing period, frequently moving the cheese while maintaining it positioned so that the unitary core member remains substantially horizontal to cause all interior portions of the cheese to be properly drained, and preventing crumbling of the interior of the cheese when cut by retaining the unitary core member in the cheese during such curing period and until the cheese is to be cut so as to develop a substantially uniform texture throughout the cheese.

2. In the manufacture of cheese, forming the prepared curd into an annular shape in which the central opening thereof is of relatively small diameter by embedding at the central axial portion of a mass of curd, a separate, unitary core member of relatively small cross-sectional area and capable of draining moisture from the interior of the cheese to the exterior thereof, curing the cheese with such unitary core member retained therein in a chamber having a uniform temperature of approximately 40° F. and for a sufficient period of time to enable the cheese to assume the proper color for use, and during such curing period maintaining the cheese positioned so that the unitary core member is disposed in a substantially horizontal position and frequently moving the cheese while maintaining such substantially horizontal position of such member so that all interior portions of the cheese are properly drained, retaining said unitary core member in the cheese throughout such curing period and during its shipment to the retailer so as to develop a substantially uniform texture throughout the cheese and to prevent the interior of the cheese from crumbling when the cheese is cut.

WILLIAM FAEHNDRICH.

REFERENCES CITED

The following references are of record in the file of this patent:

UNITED STATES PATENTS

| Number | Name | Date |
|---|---|---|
| 448,371 | Rigal | Mar. 17, 1891 |

FOREIGN PATENTS

| Number | Country | Date |
|---|---|---|
| 806,504 | France | Sept. 28, 1936 |
| 331,710 | France | Aug. 4, 1903 |

OTHER REFERENCES

"Manufacture of Cows-Milk Roquefort Cheese," Bulletin No. 970, U. S. Dept. of Agriculture, D. C., Aug. 29, 1931, pages 16 and 17.